(12) United States Patent  
Anderson et al.

(10) Patent No.: US 6,278,676 B1
(45) Date of Patent: Aug. 21, 2001

(54) MEDIA PLAYER SYSTEM FOR A VEHICLE

(75) Inventors: Rick A. Anderson, Grand Haven; Val A. Bellora, Holland, both of MI (US)

(73) Assignee: Prince Technology Corporation, Holland, MI (US)

(*) Notice: Subject to any disclaimer, the term of this patent is extended or adjusted under 35 U.S.C. 154(b) by 0 days.

(21) Appl. No.: 09/222,261

(22) Filed: Dec. 28, 1998

(51) Int. Cl.$^7$ .............................. G11B 33/02; B60R 7/04
(52) U.S. Cl. .......................................... 369/75.1; 296/37.8
(58) Field of Search ....................... 369/75.1; 360/98.07, 360/99.08, 137; 248/689, 690, 346.03, 346.05, 354.5, 503; 296/153, 72, 37.8; 361/679, 725–728, 732; 220/545, 285; 297/188, 18, 19, 411.21

(56) References Cited

U.S. PATENT DOCUMENTS

| | | | |
|---|---|---|---|
| 3,103,630 | 9/1963 | Pitts et al. | 455/346 |
| 4,532,162 | * 7/1985 | Neece | 428/31 |
| 4,633,350 | * 12/1986 | Hanson | 360/98.07 |
| 4,660,900 | * 4/1987 | Paterlini | 312/7.1 |
| 5,010,426 | * 4/1991 | Krenz | 360/97.01 |
| 5,111,360 | * 5/1992 | Baba | 361/727 |
| 5,269,698 | * 12/1993 | Singer | 439/157 |
| 5,271,590 | 12/1993 | Rosen | 248/222.1 |
| 5,609,382 | 3/1997 | Schmid et al. | 296/37.8 |
| 5,611,513 | 3/1997 | Rosen | 248/222.11 |
| 5,639,002 | * 6/1997 | Weitbrecht et al. | 224/539 |
| 5,752,740 | * 5/1998 | Volkmann et al. | 297/188.19 |
| 5,822,023 | 10/1998 | Suman et al. | 348/837 |
| 5,850,997 | 12/1998 | Rosen | 248/222.11 |
| 5,917,435 | * 6/1999 | Kamiya et al. | 340/995 |

FOREIGN PATENT DOCUMENTS

| | | | |
|---|---|---|---|
| 409232 | * | 1/1991 | (EP) . |
| 546253 | * | 6/1993 | (EP) . |
| 09-286283 | * | 11/1997 | (JP) . |
| 10-181459 | * | 7/1998 | (JP) . |

* cited by examiner

Primary Examiner—Brian E. Miller
Assistant Examiner—Angel Castro
(74) Attorney, Agent, or Firm—Foley & Lardner

(57) ABSTRACT

A media player system for a vehicle is disclosed which includes a base fixed to the vehicle and a media player releasably attached to the base for removal of the media player for use separate from the vehicle. The media player includes one or more striker pins and a terminal. A connector is provided on the mounting base for mating with the terminal to establish a power connection and connection for video and audio signals from the player. The mounting base further includes raised stanchions providing guide slots having an open end for reception of the striker pins of the media player to guide the player to a latched position and facilitate mating of the media player terminal with the connector in the mounting base. One or more latch members are provided to close the open ends of the guide slots and entrap the striker pins therein to retain the player on the base. A release handle is provided and is actuatable in a single motion to move the latch members to release positions withdrawn from the guide slots to release the striker pins and thereby release the player from the base.

43 Claims, 6 Drawing Sheets

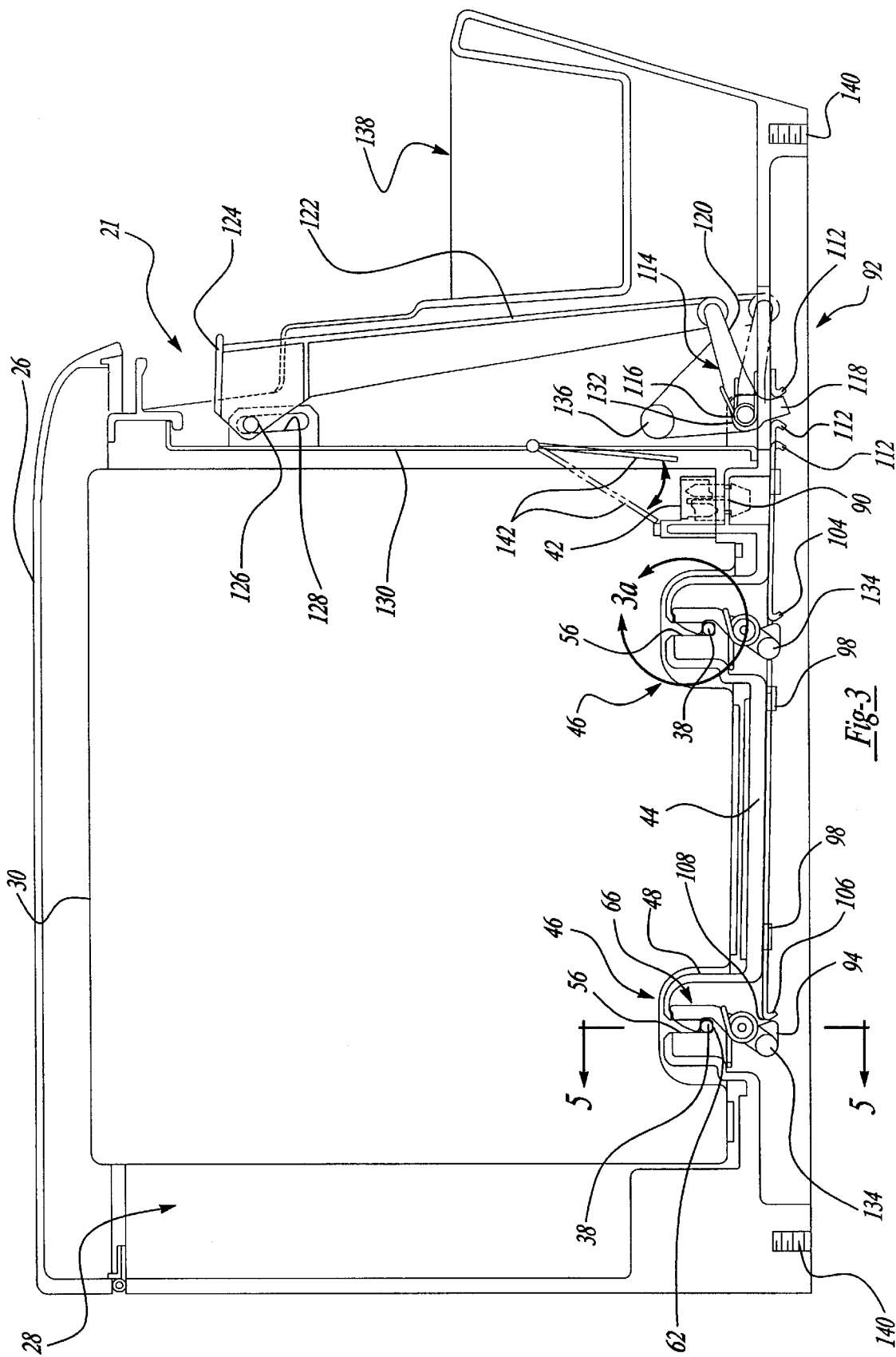

MEDIA PLAYER SYSTEM FOR A VEHICLE

BACKGROUND OF THE INVENTION

The present invention relates to a media player system for a vehicle and in particular to a system in which a media player, such as a video cassette player, is releasably mounted in a vehicle so that the player can be removed for use separate from the vehicle.

Media players, such as a video players, are becoming increasingly popular in vehicles. Video players are used in conjunction with a conventional television or other display to present images for viewing within the vehicle. It is becoming increasingly popular to provide a vehicle with one or more displays conveniently located within the vehicle for viewing by vehicle occupants. The displays may be at various locations in a vehicle such as a vehicle headliner, the rear surface of a seat back or headrest, a center floor console or elsewhere in a vehicle. Such systems often utilize a video player which is located remotely from the display and speakers and is coupled thereto by electrical cables within the vehicle.

A limitation with presently available systems is that the player is typically permanently installed in the motor vehicle and thus dedicated for use within that vehicle. It is an object of the present invention to provide greater utility in such a system by providing a media player and a mounting for the player that allows the player to be removed from the vehicle for use within a home, office, hotel room, etc.

It is a further object of the present invention to provide a removable player that can be securely and conveniently mounted in the vehicle in a single step operation by moving the player onto a mounting base in which the player is both automatically retained on the base and the necessary power and signal connections to and from the player are automatically made.

SUMMARY OF THE INVENTION

The media player system of the present invention consists of a media player having a case, an attachment device fixed to the case and a terminal fixed to the case; a base which is adapted to be fixed in a vehicle; a connector on the base which is complementary to the terminal on the media player for establishing a connection with the terminal when mated thereto; a coupling device on the base which engages the attachment device to releasably mount the player to the base; and a guide for aligning the player with the base to facilitate engagement of the attachment and coupling devices and to facilitate mating of the terminal with the connector.

The invention can also be characterized as a mounting system for releasably mounting a media player in the vehicle in which the player has attachment device and the terminal. The mounting system includes a base adapted to be fixed to the vehicle; a connector on the base complementary to the terminal for establishing a connection when mated with the terminal; a coupling device mounted to the base for engagement with the attachment device of the player to releasably mount the player to the base; and a guide for aligning the player with the base to facilitate engagement of the attachment device of the player with the coupling device and to facilitate mating of the terminal with the connector. Such a mounting system can also be used to attach other devices to a vehicle besides a media player when the media player is not being utilized. A removable console can be used with the mounting system.

In one embodiment of the invention, the mounting base may be a console having a compartment which at least partially receives the media player therein. If the compartment is sized to completely receive the media player therein, a cover may also be provided to close the compartment and conceal the media player.

In another embodiment of the invention, the media player includes a case having at least one wall with first and second recesses in the wall and first and second striker pins mounted to the case and extending across the first and second recesses respectively. A terminal is also fixed to the case wall. A connector is provided on the base that is complementary to the terminal for establishing a connection when mated with the terminal. First and second stanchions are mounted on the base and each includes a guide slot having an open end for reception of the first and second striker pins therein to align the case with the base and to facilitate mating of the terminal with the connector as the player is moved in a single direction onto the base to a latched position in which the first and second stanchions are received in the first and second recesses respectively. First and second primary latch members are movable to latch positions closing the open ends of the guide slots to entrap the first and second striker pins therein to retain the player on the base. A release handle is operatively associated with the first and second primary latch members and is actuatable in a single motion to move the first and second primary latch members to release positions withdrawn from the guide slots to release the striker pins from the slots and thereby release the player from the base.

Further objects, features and advantages of the invention will become apparent from a consideration of the following description and the appended claims when taken in connection with the accompanying drawings.

BRIEF DESCRIPTION OF THE DRAWINGS

FIG. 3 is a side view of one embodiment of the mounting base of the system of the present invention;

DETAILED DESCRIPTION OF THE PREFERRED EMBODIMENT

Figure 1:
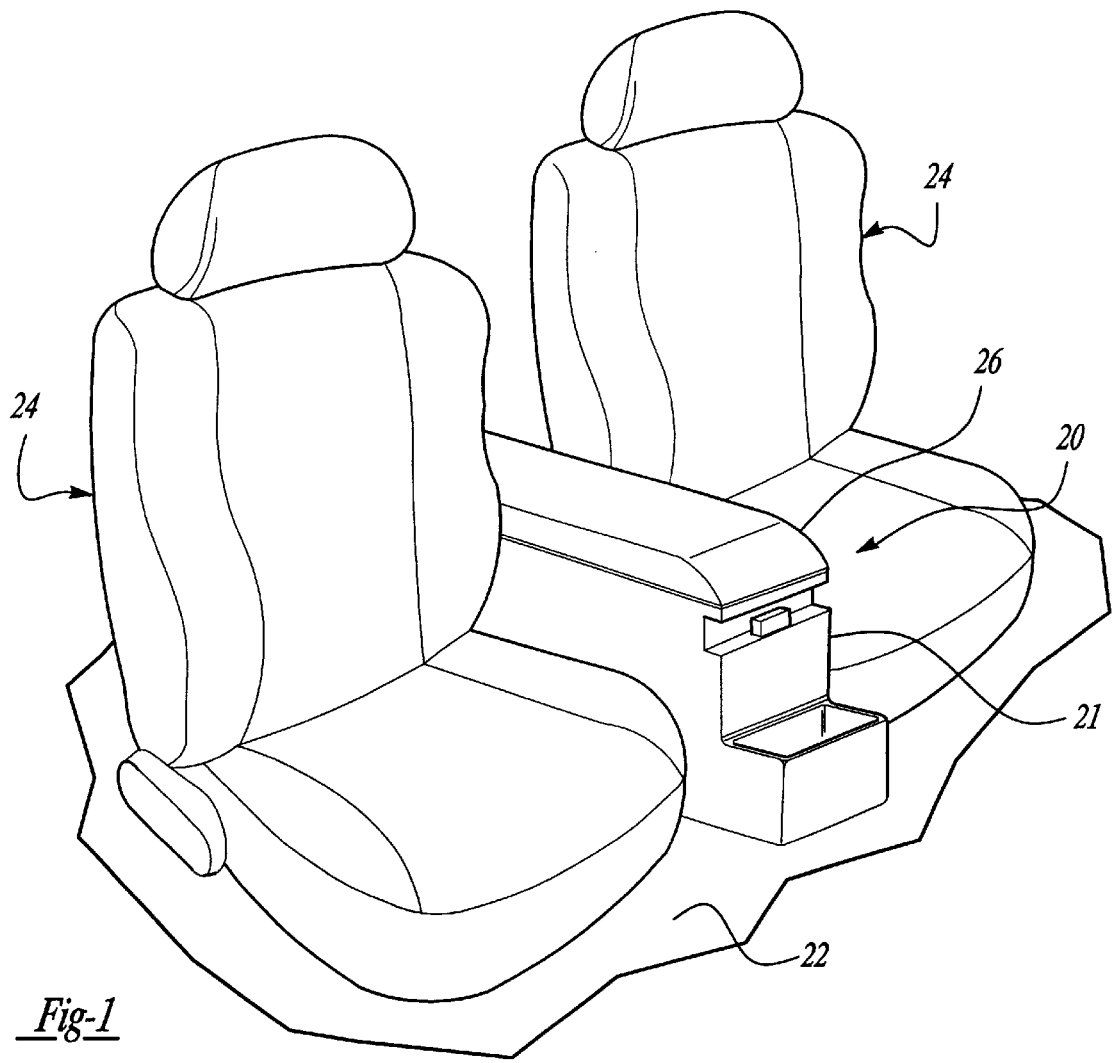
FIG. 1 is perspective view showing the media player system of the present invention in the form of a console installed within a motor vehicle.
Figure 3A:
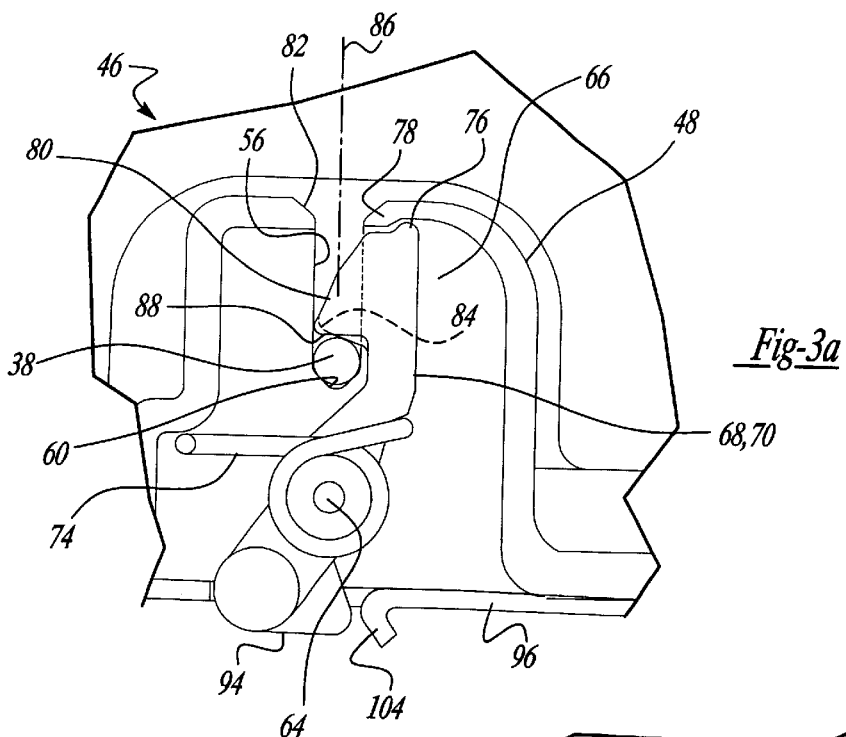
FIG. 3a is an enlargement of the circled portion of FIG. 3.

With reference to FIG. 1, the media player system of the present invention is shown installed on a vehicle and designated generally at 20. The system 20 includes a mounting base in the form of a floor console 21 attached to the floor 22 of a vehicle body. As illustrated, the mounting base or console 21 is positioned adjacent to a seat assembly 24 for convenient access to the console by an occupant seated in the seat assembly 24. The console 21 has a cover 26 which forms an upper surface of the console 21 and which can be padded for comfortable use as an armrest for an occupant of the seat assembly 24. The cover 26 can be raised to an open position, opening an internal compartment 28 (FIG. 3).

The compartment 28 is sized to receive and contain a media player 30 therein. The media player 30 can be a video cassette player, a video cassette recorder, a digital video disk player, computer, game device or other device providing a video signal for presentation on a visual display or an audio signal for a speaker. Such a player typically plays one or more types of media such as a tapes, electrical disk or optical disk. The term "media player" is broadly used herein and includes all currently known such devices as well as those developed in the future. The media player 30 may also include a receiver and tuner for receiver broadcast signals.

Figure 2:
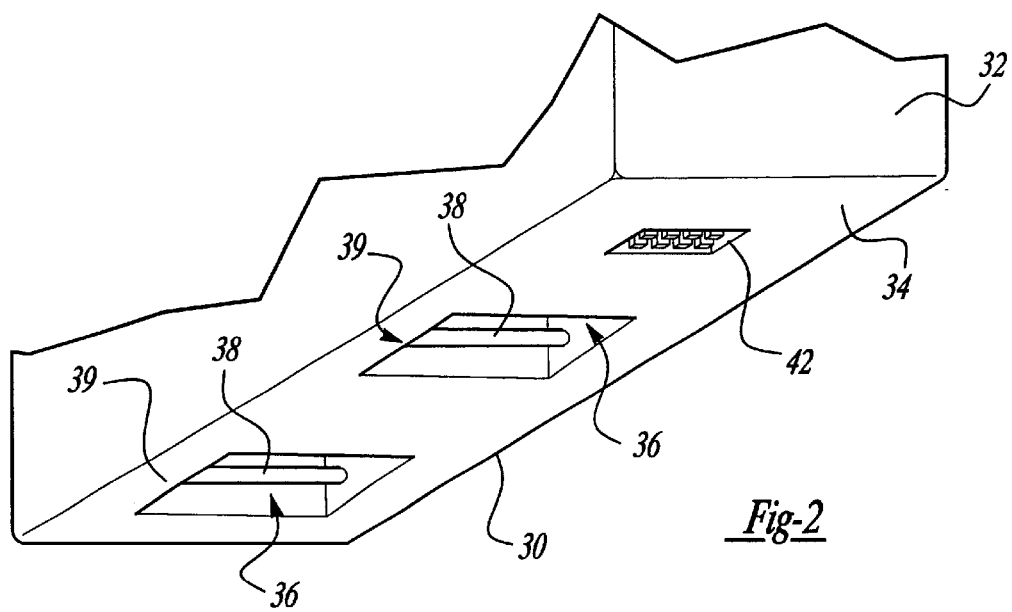
FIG. 2 is bottom perspective view of the media player illustrating the attachment device and terminal on the player case.
Figure 5:
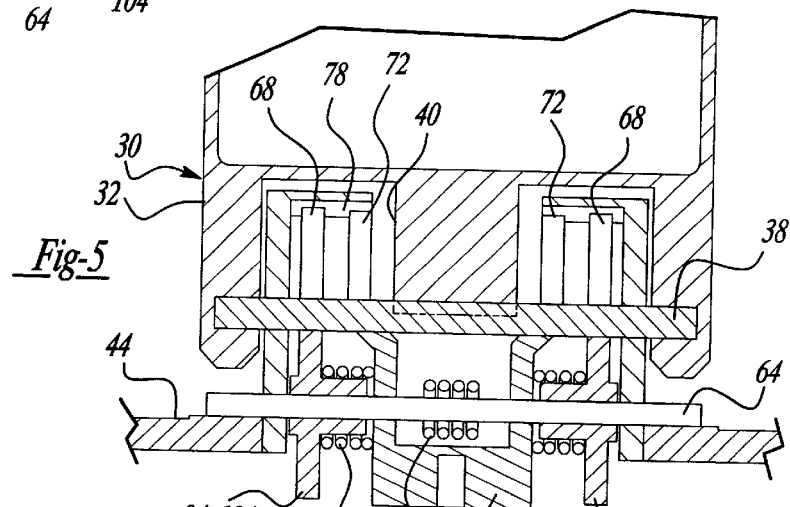
FIG. 5 is a sectional view as seen from substantially the line 5—5 of FIG.3.

The bottom of the player 30 is shown in FIG. 2. The player 30 includes a case 32 housing the working components of the player. The case 32 has a lower wall 34 which is formed with a pair of recesses 36. Spanning across each recess 36 is a striker pin 38 forming attachment device 39 for mounting the player 30 to the console 21. The recesses 36 may each contain a center block 40 (FIG. 5) that extends from an upper end of the recess to the striker pin 38 in the center region of the striker pin 38. The center blocks 40 provides center support for the striker pins 38 to prevent damage to the pins from an impact when the media player is removed from the mounting base.

In addition to the recesses, the lower wall 34 of the case 32, includes a terminal 42 used to connect the media player to a power source and also to deliver video and audio signals from the player 30. Other terminals may be provided on the player 30 to connect the player to an alternating current power source and to connect the video player to a conventional television set and/or speakers for use separate from the mounting base and from the vehicle in which it is installed.

Figure 6:
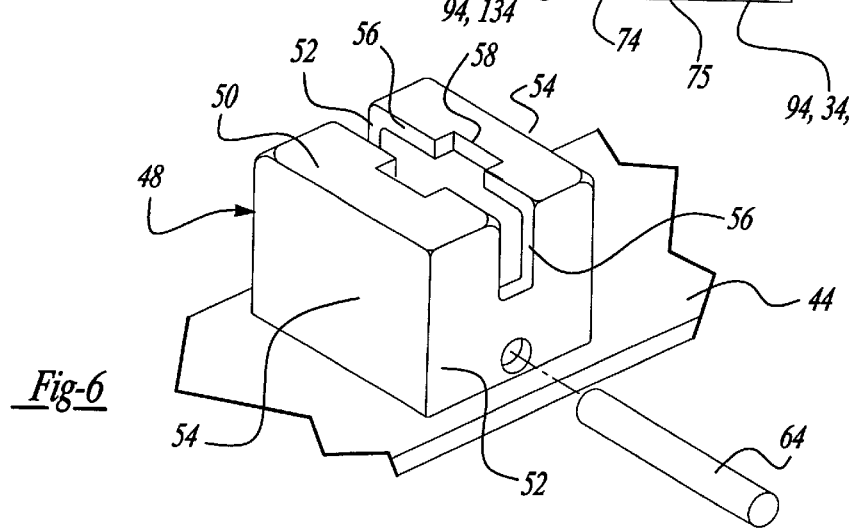
FIG. 6 is perspective view of the raised stanchion providing a guide for the media player in the latch position.
Figure 4:
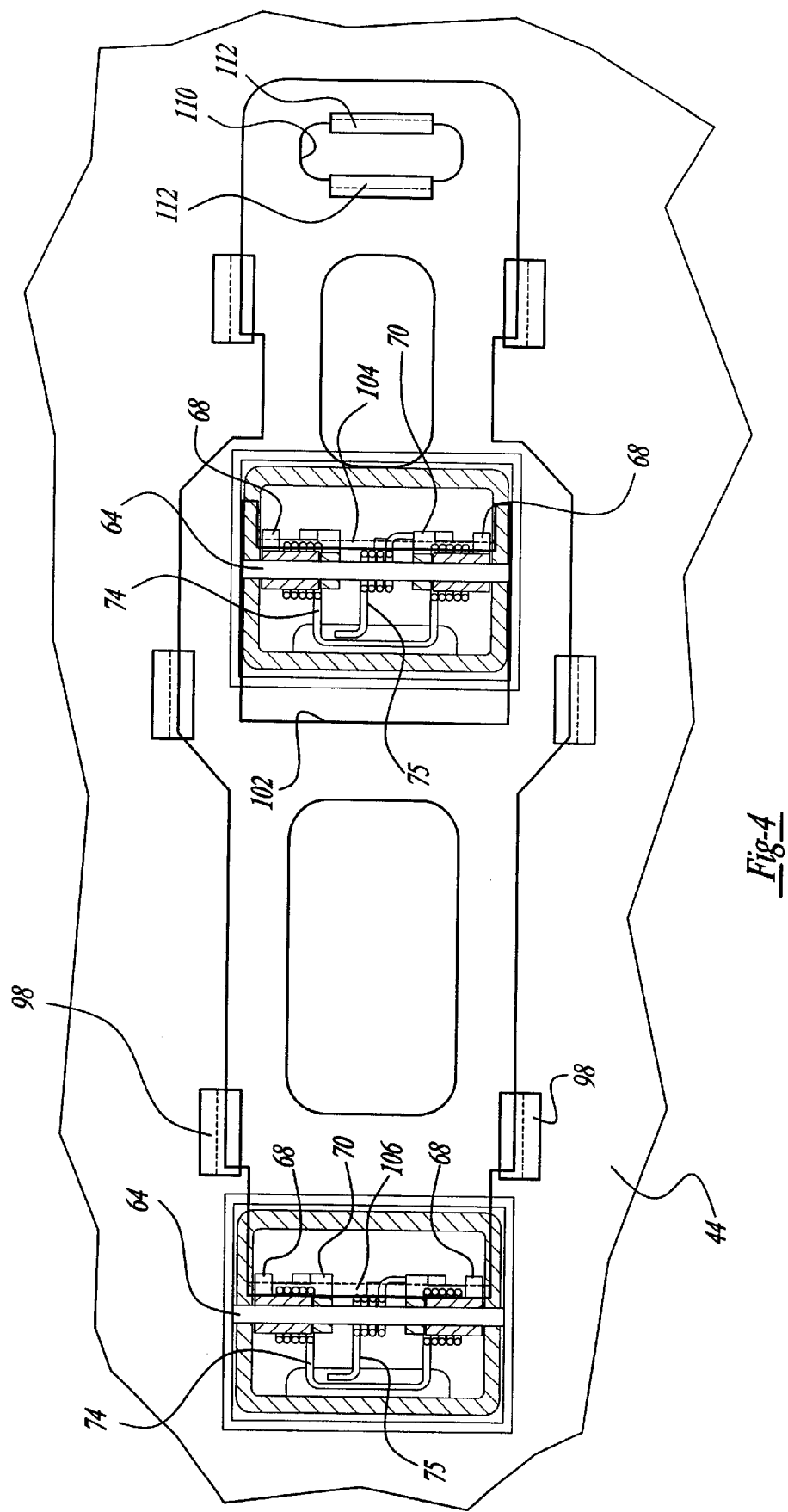
FIG. 4 is a bottom view of the mounting base shown in FIG. 3.

The console 21 of the player includes a wall 44 which carries one or more coupling devices 46 for engagement with the attachment devices 39 in the player 30. Each coupling device 46 includes a raised stanchion 48, shown in greater detail in FIG. 6. Each raised stanchion 48 forms a housing extending from the wall 44. In the embodiment shown in FIG. 3, the stanchion 48 is integrally molded with the wall 44 as a unitary piece. Each stanchion 48 has an upper wall 50, spaced end walls 52 and spaced side walls 54. The top wall 50 and the end walls 52 include a slot 56 which receives the striker pin 38 of the player 30. The stanchions 48 are sized to be received within the recesses 36 of the player 30. In addition, the slot 56 has an enlarged center region 58 in the top wall 50 for receiving the center block 40 supporting the striker pin 38.

The closed end 60 of the slot 56 in one stanchion 48 is contoured with a V-shaped (FIG. 3a) while the closed end 62 of the slot 56 in the other stanchion has a flat bottom. The V-shaped closed end 60 is used to locate the striker pin 38 precisely within one stanchion 48 while in the other stanchion, the striker pin 38 is positioned anywhere within the width of the slot 56 on the flat closed end 62. A U-shaped contoured closed end can also be used to locate the striker pin.

Each stanchion 48 carries a pivot pin 64 which rotatably mounts a plurality of latch members 66 in the form of primary and secondary latch hooks 68, 70, as described below. A pair of primary latch hooks 68 are provided on each pivot pin 64 together with a secondary latch hook 70 formed with two hook portions 72. A torsion spring 74 engages the two primary latch hooks 68 and urges the primary latch hooks to a latch position shown in FIG. 3 in which the upper end 76 of the primary latch hooks 68 engages a stop 78 formed by the stanchion 48. A torsion spring 75 urges the secondary latch hook 70 against the stop 78. Both the primary latch hooks 68 and the secondary latch hook 70 have tapered cam surfaces 80 which face the open end 82 of the slot 56. When the player 30 is attached to the mounting base, the striker pins 38 move into the slots 56 and engage the cam surfaces 80 of the latch hooks, rotating the latch hooks in opposition to the torsion springs 74, 75. This causes the latch hooks to rotate out of the slots 56, allowing the striker pins 38 to move to the closed ends 60, 62 of the slots 56. Once the striker pins 38 reach the closed ends of the slots 56, the latch hooks rotate back to the latch positions in which they close the open end 82 of the slots and entrap the striker pins 38 therein. While torsion springs 74, 75 are shown, it will be recognized that other types of biasing springs can be utilized with equal results.

The primary latch hooks 68 each have a hook engaging surface 84 which is inclined to the longitudinal axis 86 of the respective slot 56. As a result, when the latch hooks 68 move further into the slots 56 as the latch hooks 68 rotate to the latch positions, the engagement surface 84 gradually moves closer to the slot closed ends 60, 62 until the latch hooks engage the striker pin 38. The inclined engagement surface ensures contact of the primary latch hook 68 with the striker pin 38 to hold the striker pin against the closed end 60 of the slots 56 to prevent vibration and rattle of the player 30 in the mounting base. A disadvantage of the inclined engagement surface 84 is that a force on the player causing the striker pins 38 to push against the hook engagement surfaces 84 produces a torque on the primary latch hooks 68 which tends to rotate the latch hooks toward the release position. To prevent release of the player, the secondary latch hook 70 is provided. The hook portions 72 of the secondary latch hook 70 have an engagement surface that is perpendicular to the longitudinal axis 86 of the slot 56. A force applied to the engagement surface 88 of the secondary hook 70 by the striker pins 38 does not produce a rotational moment and will not move the secondary latch hook 70 toward a release position. Thus, the primary latch hooks 68 provide rattle free retention of the player 30 while the secondary latch hooks 70 provide retention under a shock load such as that occurring during a vehicle collision, to securely retain the player in place.

The console 21 further includes a connector 90 which is complementary to the terminal 42 on the player 30. The terminal 42 and connector 90 are positioned relative to the attachment device 39 and the coupling device 46 respectfully, such that when the striker pins 38 are brought into alignment with the slots 56 and inserted therein, the terminal 42 mates with the connector 90. The connector 90 and terminal 42 provide connection for power supply to the player 30 and for transmission of the video and audio signals from the player 30. The connector 90 is coupled to appropriate cables (not shown) within the vehicle to provide power to the video player and to transmit the video and audio signals from the video player to remotely located speakers and display within the vehicle.

A release mechanism 92 is provided to selectively rotate the primary latch hooks 68 and the secondary latch hooks 70 to a release position, withdrawn from the slots 56, whereby the striker pins 38 can be removed from the slots 56. The primary and secondary latch hooks 68, 70 extend through the wall 44 to end portions 94. A slide plate 96 is mounted to the wall 44 by molded tabs 98. The slide plate 96 is movable fore and aft as shown by the arrow 100. The slide plate 96 includes an aperture 102 defined along one edge by a downturned flange 104. The primary and secondary latch hooks 68, 70 at one stanchion 48 extend down into the aperture 102. The other latch hooks are positioned adjacent to a second downturned flange 106 at the end 108 of the slide plate 96. An aperture 110 is formed in the slide plate and has opposite sides formed by downturned flanges 112.

A bell crank 1 14 is pivotally mounted to the wall 44 by a pivot 116. A short arm 118 of the bell crank 114 extends through the aperture 110 in the slide plate. Rotation of the bell crank in a clockwise direction, as viewed in FIG. 3, causes the short arm 118 of the crank to move the slide plate 96 to the left. This causes the downturned flanges 104, 106 to bear against the end portions 94 of the latch hooks and rotate the latch hooks clockwise as viewed in FIG. 3, such that the latch hooks are withdrawn from the slots 56, opening the slots 56 and releasing the striker pins 38 thereby freeing the media player 30 from the mounting base.

The bell crank 114 has a long arm 120 coupled to a push rod 122 which extends upwardly to a handle 124 near the upper end of the console 21. The push rod 122 includes a guide pin 126 that travels in a slot 128 formed in the upstanding wall 130 of the compartment 28. When the handle 124 is actuated by pressing downward, the push rod 122 moves downward, causing the bell crank 114 to rotate in a clockwise direction as described above, to move the latch hooks to the release positions. A torsion spring 132 on the bell crank pivot 116 biases the bell crank 114, and hence the slide plate 96 and push rod 122, to the latch position. Other types of springs can be used in place of a torsion spring.

The end portions 94 of the latch hooks 68, 70 include counter weights 134. The counter weights 134 are provided so that the center of gravity of the latch hooks is at the pivot pin 64. As a result, acceleration of the vehicle occurring during a collision will not produce an inertia force on the latch hooks which causes rotation of the latch hooks to the release position. Likewise, the bell crank 114 is provided with a counter weight 136. That counteracts inertia forces of the slide plate 96 during a vehicle collision to prevent the slide plate 96 from moving to release the latch hooks.

A door 142 is provided within the compartment 28 and is hinged to the wall 130. The door is spring biased to a closed position shown in phantom line in FIG. 3 in which it covers the connector 90. The door 142 prevents objects from inadvertently being dropped onto the connector 90 when the player 30 is not installed. When the player 30 is moved into the compartment 28, the player pushes the door 142 to an open position along the wall 130.

The console 21 is shown with an exemplary front compartment 138 that can be used for general storage. The wall 44 of the console or mounting base is provided with apertures 140 or other features for securing the console 21 to the vehicle floor 22.

Figure 7:
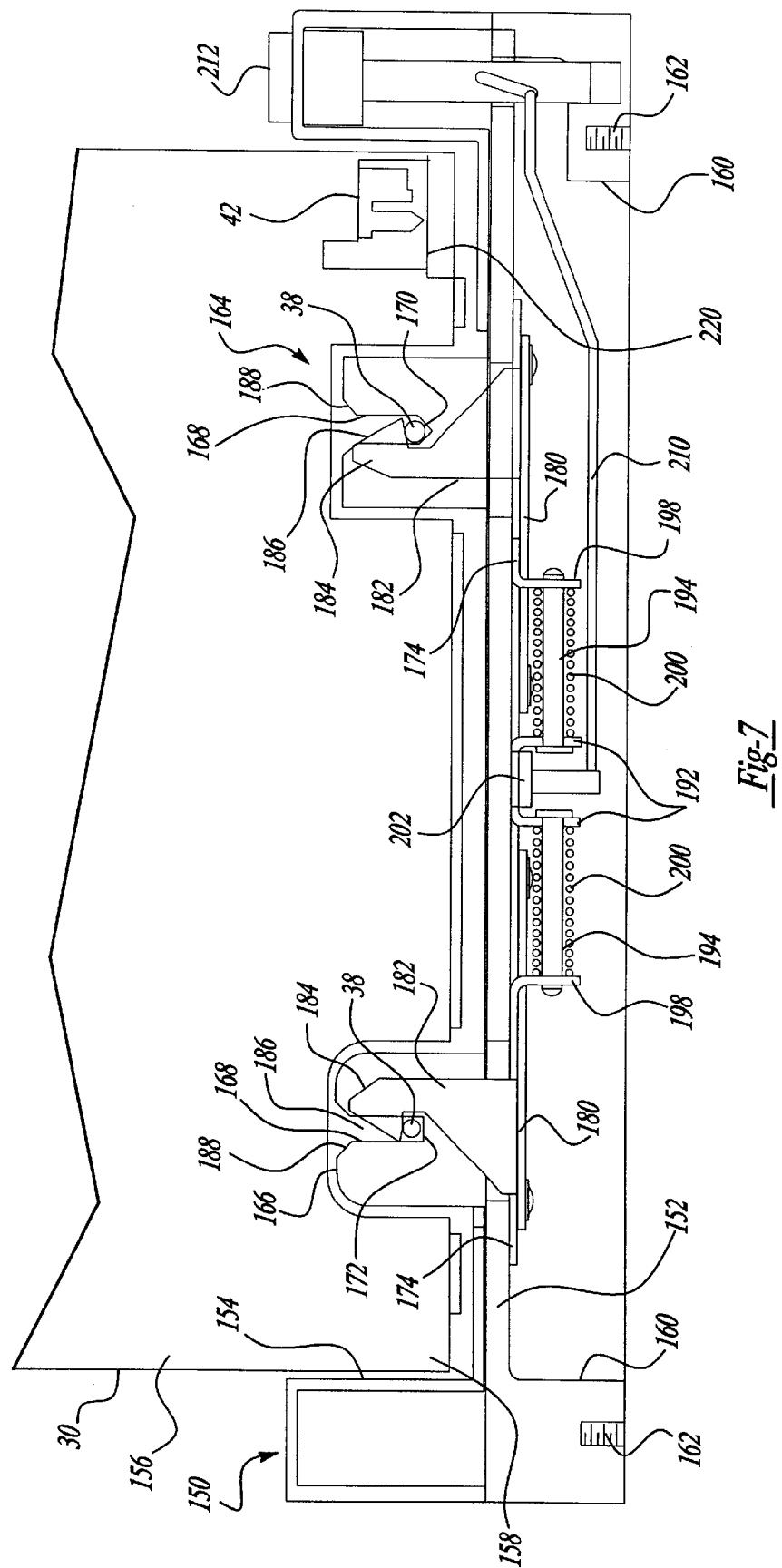
FIG. 7 is a side view of an alternative embodiment of the mounting base of the system of the present invention.
Figure 8:
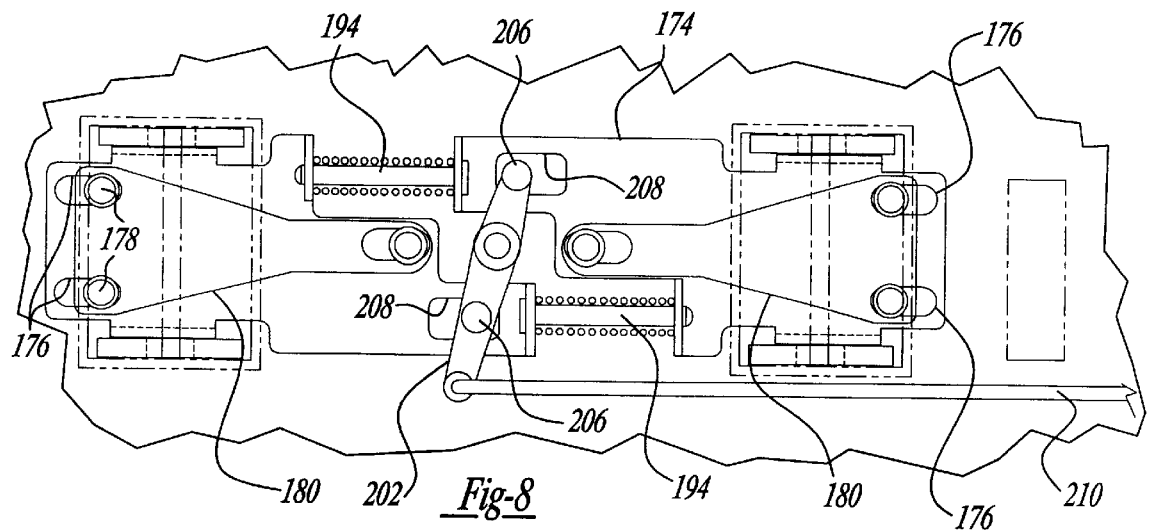
FIG. 8 is a bottom view of the mounting base of FIG. 7.
Figure 9:
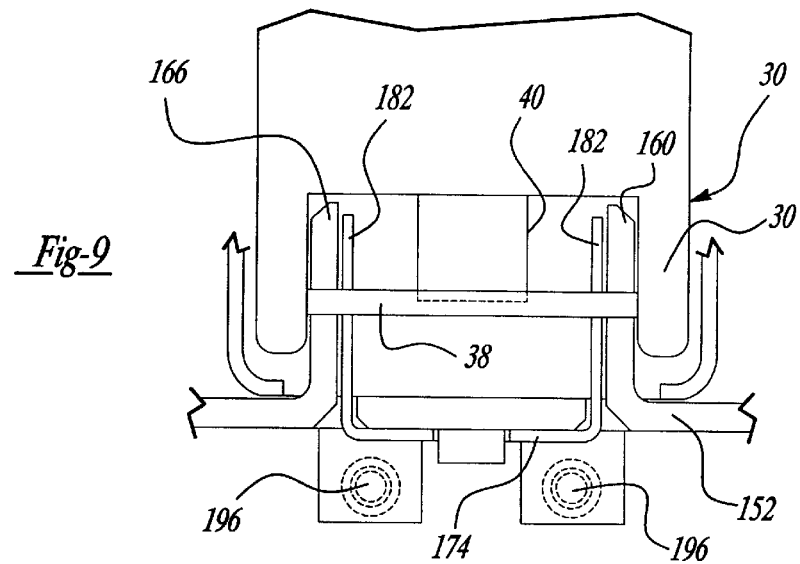
FIG. 9 is a section view as seen from the line 10—10 of FIG. 7.

An alternative embodiment of the present invention is shown in FIGS. 7, 8 and 9. There, a mounting base 150 is shown which has a wall 152. A wall 154 which extends from the wall 152 forming a recess 156 which receives a lower end portion 158 of the player 30. The mounting base 150 can be secured to the vehicle floor or can be secured elsewhere in the vehicle if desired. One alternative position is beneath a vehicle seat in which the wall 152 is oriented vertically.

The wall 152 forms legs 160 having apertures 162 for securing the mounting base 150 to the vehicle body. The mounting base 150 includes an alternative coupling device 164 as described below.

The coupling device 164 includes stanchions 166 in the form of flanges integrally formed with the wall 152 and extending therefrom. A pair of flanges extend into each of the recesses 36 in the player 30. The stanchions 166 include slots 168 having an open end 188 and closed ends 170, 172. The closed end 170 is V-shaped while the closed end 172 is flat as described above in connection with the slots 56 and the slot ends 60, 62.

A pair of slide plates 174 are slidably mounted to the wall 152. The slide plates include slots 176 through which threaded fasteners 178 extend. A retaining plate 180 is placed beneath each slide plate 174 and is held in place by the threaded fasteners 178. The slide plates 174 are thus able to move fore and aft along the length of the slots 176. Each slide plate 174 includes a pair of upturned flanges 182 forming latch hooks 184. The latch hooks 184 have an inclined cam surface 186 facing the open end 188 of the slots. The striker pins 38 engage the cam surfaces 186 as the striker pins move through the slots 168, causing the slide plates 174 to move laterally and withdraw the latch hooks from the slots 168. This allows the striker pins 38 to reach the closed ends of the slots after which the slide plates 174 are then moved back to the latch position, closing the open ends 188 of the slots and entrapping the striker pins 38 therein. The latch hooks 184 have an inclined engagement surface 190 to ensure engagement of the latch hooks 184 with the striker pin 38 to eliminate looseness and rattling of the player 30.

Each slide plate 174 has a downturned flange 192 which supports a guide pin 194 extending therefrom. The guide pins 194 extend through apertures 196 in downturn flanges 198 of the opposite slide plate 174. Each pin 194 carries a compression spring 200. The compression springs 200 bias the two slide plates 174 away from each other into the latch position.

A crank arm 202 is pivotally mounted to the wall 152 by a pivot 204. The crank arm 202 includes a pair of pins 206 positioned within slots 208 in the slide plates 174. The crank arm 202 is coupled to a push rod 210, the other end of which is coupled to a release handle 212. When the release handle 212 is actuated, the push rod 210 rotates the crank arm 202 which in turn moves the two slide plates 174 toward one another, withdrawing the latch hooks 184 from the slots 168.

Like the console 21, the mounting base 150 includes a connector 220 which mates with the terminal 42 of the player 30.

The console 21 and mounting base 150 include different coupling devices for engagement with the striker pins 38 of the video player. It will be appreciated that the coupling device 164, shown in conjunction with the mounting base 150, can be incorporated into the console 21 having the compartment for totally enclosing the video player. Likewise, the coupling device 46 shown in the console 21 can be utilized in the shorter mounting base 150 shown in the FIGS. 7, 8 and 9.

The preferred embodiment of the media player system has been shown and described in which the player case includes a pair of striker pins 38 and the coupling device on the base includes at least two latch members for entrapping the striker pins within the guide slots. This is a preferred embodiment for providing a rattle free mounting of the player as well as ensuring an adequate attachment to prevent inadvertent release of the player during a vehicle collision. It will be readily appreciated that a media player system can be provided in which the media player includes a single striker pin and the base provides only a single latch member for entrapping the striker pin to attach the player to the base.

The media player system of the present invention enables a media player to be releasably mounted in a motor vehicle for use of the player in the vehicle. The releasable coupling of the player enables the player to be removed from the vehicle for use separate from the vehicle. This enables the vehicle user to use the player both while in the vehicle and also at home, in an office, a hotel room or summer cottage, etc. The media player is conveniently coupled to the mounting base by single direction movement of the player to its latch position in which the coupling device automatically couples to the player along with automatic coupling of the player terminal and mounting base connector. Removal of the player is accomplished by a single actuation of a release handle accompanied by lifting or pulling of the player from the mounting base. No additional attachment or connection operations are required by the user to mount or remove the media player 30.

It is to be understood that the invention is not limited to the exact construction illustrated and described above, but the various changes and modifications may be made without departing from the spirit and scope of the invention as defined in the following claims.

What is claimed is:

1. A mounting system for releasably mounting a media player in a vehicle, the media player having an attachment device and a terminal, said mounting system comprising:
    a base adapted to be located within the vehicle;
    a connector on said base complementary to the terminal of the media player for establishing a connection when mated with the terminal;
    a coupling device mounted to said base for engagement with the attachment device of the media player to releasably mount the media player to said base;
    a guide for aligning the media player with said base to facilitate mating of the terminal with said connector as the media player is moved to a latched position wherein said attachment device comprises a recess in said case and a striker pin fixed to said case and extending across said recess and wherein said coupling device includes a latch member engagable with said striker pin; and
    wherein said guide includes a raised stanchion having a guide slot with an open end to receive said striker pin of said media player and said latch member is movable to a latch position closing said open end of said guide slot to trap said striker pin within said guide slot whereby said player is retained to said base.

2. The mounting system as defined in claim 1 wherein said guide defines a direction of movement of the media player to said latched position in which said coupling device engages with the attachment device of the media player to mount the media player to said base and said connector mates with the terminal both upon the single action of moving the media player to said latched position.

3. The mounting system as defined in claim 2 wherein said coupling device includes a release handle actuatable with a single motion to release said coupling device whereby the media player is removable from said base.

4. The mounting system as defined in claim 1 wherein said base has an upstanding wall forming a recess for receiving the media player.

5. The mounting system as defined in claim 1 wherein said base forms a housing having a compartment with an open end to receive the media player and a cover for closing said open end of said compartment to conceal the media player.

6. A media player system for a vehicle comprising:
    a media player having a case, an attachment device fixed to said case and a terminal fixed to said case;
    a base adapted to be fixed in the vehicle;
    a connector on said base complementary to said terminal for establishing a connection when mated with said terminal;
    a coupling device mounted to said base for engagement with said attachment device to releasably mount said media player to said base; and
    a guide for aligning said media player with said base to facilitate engagement of said attachment device of the media player with said coupling device and to facilitate mating of said terminal with said connector as said media player is moved to a latched position upon said base, wherein said guide includes a raised stanchion having a guide slot with an open end to receive said striker pin of said media player and said latch member is movable to a latch position closing said open end of said guide slot to trap said striker pin within said guide slot whereby said media player is retained to said base.

7. The media player system as defined in claim 6 wherein said guide defines a direction of movement of said media player to said latched position in which said coupling device engages with said attachment device of said media player to mount said media player to said base and said connector mates with said terminal both upon the single action of moving said media player to said latched position.

8. The media player as defined in claim 7 wherein said coupling device includes a release handle actuatable with a single motion to release to said coupling device whereby said media player is removable from said base.

9. The media player as defined in claim 6 wherein said base has an upstanding wall forming a recess for receiving said media player.

10. The media player as defined in claim 6 wherein said base forms a housing having a compartment with an open end to receive said media player and a cover for closing said open end of said compartment to conceal said media player.

11. The media player as defined in claim 6 wherein said guide includes a raised stanchion engagable with said media player to guide said media player to said latched position.

12. The media player as defined in claim 6 and wherein said attachment device comprises a recess in said case and a striker pin fixed to said case and extending across said recess and wherein said coupling device includes a latch member engagable with said striker pin.

13. A media player system for a vehicle comprising:
    a media player having a case, an attachment device fixed to said case and a terminal fixed to said case;
    a base adapted to be fixed in the vehicle;
    a connector on said base complementary to said terminal for establishing a connection when mated with said terminal;
    a coupling device mounted to said base for engagement with said attachment device to releasably mount said media player to said base;
    a guide for aligning said media player with said base to facilitate engagement of said attachment device of the media player with said coupling device and to facilitate mating of said terminal with said connector as said media player is moved to a latched position upon said base;

said attachment device comprises a pair of recesses in said case and a pair of striker pins fixed to said case with one of said striker pins extending across each of said recesses;

said guide includes a pair of raised stanchions each having a guide slot with an open end to receive said striker pins thereto to guide the motion of said player to said latched position; and said coupling device includes at least two latch members, each said latch member being moveable to a latch position closing said open end of said guide slots to trap said striker pins within said guide slots whereby said media player is retained to said base.

14. The media player system as defined in claim 13 wherein said stanchions form raised housings having an upper wall and a pair of end walls, said upper wall and said end walls of each stanchion having an opening therein to form said guide slots.

15. The media player system as defined in claim 13 wherein said stanchions are projecting flanges having a slot formed therein.

16. The media player system as defined in claim 13 further comprising at least two latch members closing the open end of each of said guide slots to entrap said striker pins therein.

17. The media player system as defined in claim 16 wherein one of said latch members entrapping each of said striker pins engages said striker pins to prevent rattling of said media player.

18. The media player system as defined in claim 17 wherein one of said guide slots has a contoured closed end to position one of said striker pins.

19. The media player system as defined in claim 18 wherein said contoured closed end is V-shaped.

20. The media player system as defined in claim 14 wherein said coupling device includes a slide plate movably mounted to said base and operatively associated with said latch members to move said latch members to release positions clear of said guide slots to free said striker pins and release said media player.

21. The media player system as defined in claim 19 wherein said latch member is integrally formed with said slide plate.

22. The media player system as defined in claim 13 wherein said coupling device includes a release handle carried by said base and operably coupled to said latch members and actuatable with a single motion to release said coupling device whereby said media player is removable from said base.

23. The media player system as defined in claim 13 wherein one of said at least two latch members has an engagement surface which is inclined to engage said striker pin when in said latch position and another of said at least two latch members has an engagement surface which is generally perpendicular to a longitudinal axis of said guide slot in said latch position.

24. A media player system for a vehicle comprising;

a console adapted to be fixed within the vehicle, said console having a compartment with an open end;

a media player having a case, an attachment device fixed to said case and a terminal fixed to said case, said case being sized to be at least partially received in said compartment;

a connector in said compartment complementary to said terminal for establishing a connection when mated with said terminal;

a coupling device mounted to said console in said compartment for engagement with said attachment device to releasably mount said media player to said console; and a guide in said compartment for aligning said media player with said console to facilitate engagement of said attachment device of the media player with said coupling device and to facilitate mating of said terminal with said connector as said media player is moved to a latched position; wherein said guide includes a raised stanchion having a guide slot with an open end to receive said striker pin of said media player and said latch member is movable to a latch position closing said open end of said guide slot to trap said striker pin within said guide slot whereby said media player is retained to said console.

25. The media player system as defined in claim 24 wherein said guide defines a direction of movement of said player to said latched position at least partially in said compartment in which said coupling device engages with said attachment device of said media player to mount said media player to said console and said connector mates with said terminal both upon the single action of said media player to said latched position.

26. The media player system as defined in claim 25 wherein said coupling device includes a release handle carried by said console and actuatable with a single motion to release said coupling device whereby said media player is removable from said console.

27. The media player system as defined in claim 24 wherein said compartment is sized to entirely receive said entire media player and said console further includes a cover for closing said compartment to conceal said media player therein.

28. The media player system as defined in claim 24 wherein said guide includes a raised stanchion engagable with said media player to guide said player.

29. The media player system as defined in claim 24 wherein said attachment device comprises a recess in said case and a striker pin fixed to said case and extending across said recess and wherein said coupling device includes a latch member engagable with said striker pin.

30. A media player system for a vehicle comprising;

a console adapted to be fixed in the vehicle, said console having a compartment with an open end;

a media player having a case, an attachment device fixed to said case and a terminal fixed to said case, said case being sized to be at least partially received in said compartment;

a connector in said compartment complementary to said terminal for establishing a connection when mated with said terminal;

a coupling device mounted to said console in said compartment for engagement with said attachment device to releasably mount said media player to said console;

a guide in said compartment for aligning said media player with said console to facilitate engagement of said attachment device of the media player with said coupling device and to facilitate mating of said terminal with said connector as said media player is moved to a latched position; and said attachment device comprises a pair of recesses in said case and a pair of striker pins fixed to said case with one of said striker pins extending across each of said recesses;

said guide includes a pair of raised stanchions each having a guide slot with an open end to receive said striker pins therein to guide the motion of said media player to said latched position; and said coupling device includes at least two latch members, each said latch member being movable to a latch position closing said open end of said guide slots to trap said striker pins within said guide slots whereby said media player is retained to said console.

31. The media player system as defined in claim 30 wherein said coupling device includes a release handle carried by said console and operably coupled to said latch members and actuatable with single motion to release said coupling device whereby said media player is removable from said console.

32. The media player system as defined in claim 31 wherein said release handle is located adjacent said open end of said compartment.

33. The media player system as defined in claim 30 wherein one of said at least two latch members has an engagement surface which is inclined to engage said striker pin when in said latch position and another of said at least two latch members has an engagement surface which is generally perpendicular to a longitudinal axis of said guide slot in said latch position.

34. A media player system for a vehicle comprising:
a base adapted to be fixed in the vehicle;
a media player having a case with at least one wall, first and second recess in said one wall, first and second striker pins mounted to said case and extending across said first and second recesses respectively, and a terminal fixed to said at least one wall;
a connector on said base complementary to said terminal for establishing a connection when mated with said terminal;
first and second raised stanchions mounted to said base, said first raised stanchion including a first guide slot and second raised stanchion including a second guide slot, each of said first and second guide slots having an open end for reception of said first and second striker pins therein, respectively, to align said case with said base and to facilitate mating of said terminal with said connector as said media player is moved in a single direction onto said base to a latched position in which said first and second stanchions are received in said first and second recesses of said case respectively;
first and second primary latch members movable to latch positions closing said open ends of said first and second guide slots to entrap said first and second striker pins therein to retain said media player on said base; and
a release handle operatively associated with said first and second primary latch members and actuatable in a single motion to move said first and second primary latch members to release positions withdrawn from said guide slots to release said striker pins from said slots and thereby release said media player from said base.

35. The media player system as defined in claim 34 further comprising first and second secondary latch members movable to latch positions closing said open ends of said first and second guide slots to entrap said first and second striker pins therein to retain said media player on said base, said secondary latch members having an engagement surface which is generally perpendicular to a longitudinal axis of said guide slots when said secondary latch members are in said latch position and wherein said first and second primary latch members engage said striker pins to resist rattling of said case when retained on said base.

36. The media player system as defined in claim 34 further comprising at least one slide plate coupling said release handle with said first and second primary latch members, said slide plate being movable to move said first and second primary latch members to said release positions.

37. The media player system as defined in claim 36 wherein said first and second primary latch members are integrally formed with said at least one slide plate.

38. The media player system as defined in claim 36 further comprising a counter weight to resist movement of said at least one slide plate by inertia forces acting on said at least one slide plate during a vehicle collision.

39. The media player system as defined in claim 34 wherein said first and second primary latch members are rotatably mounted to said base for rotation about a pivot axis between latch and release positions.

40. The media player system as defined in claim 39 wherein said first and second primary latch members each have a center of gravity approximately at said pivot axis to resist rotation of said first and second primary latch members by inertia forces acting on said first and second primary latch members during a vehicle collision.

41. The media player system as defined in claim 34 wherein said base is a console having a compartment with an open end for at least partially receiving said player therein.

42. The media player system as defined in claim 41 further comprising a cover for closing said open end of said compartment to conceal said media player therein.

43. The media player system as defined in claim 41 further comprising a movable door within said compartment to cover said connector.

* * * * *